No. 864,460. PATENTED AUG. 27, 1907.
J. ERTNER & A. JEREMIAS.
WEIGHING APPARATUS.
APPLICATION FILED MAR. 10, 1905.

Witnesses:

Inventors:
Julius Ertner
Arnold Jeremias
by Eustace N. Hopkins
Attorney

UNITED STATES PATENT OFFICE.

JULIUS ERTNER AND ARNOLD JERÉMIÁS, OF BUDAPEST, AUSTRIA-HUNGARY, ASSIGNORS TO THE FIRM OF ELSÖ MAGYAR AUTOMETERTÁRSASÁG FLEINER ÉS ERTNER, OF BUDAPEST, AUSTRIA-HUNGARY.

WEIGHING APPARATUS.

No. 864,460.

Specification of Letters Patent.

Patented Aug. 27, 1907.

Application filed March 10, 1905. Serial No. 249,448.

*To all whom it may concern:*

Be it known that we, JULIUS ERTNER and ARNOLD JERÉMIÁS, subjects of the King of Hungary, and residing at Budapest, Austria-Hungary, have invented a new and useful Improved Weighing Apparatus for Goods of Every Kind, of which the following is a description.

The present invention consists of an automatic weighing machine for piece or granular goods or also for liquids, and comprises the details of construction hereinafter set forth and particularly pointed out in the claims.

In order to render the present specification easily intelligible reference is had to the accompanying drawing in which similar numerals of reference denote similar parts throughout the several views.

Figure 1:
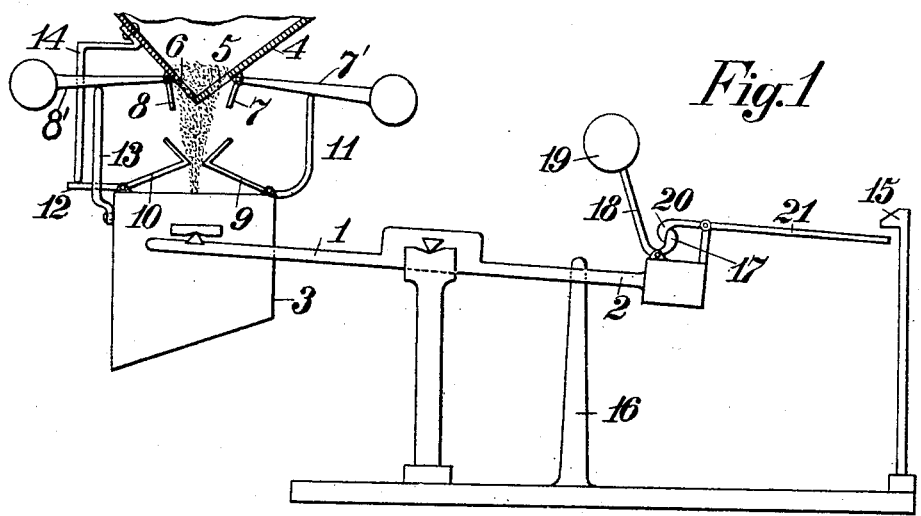
Figure 2:
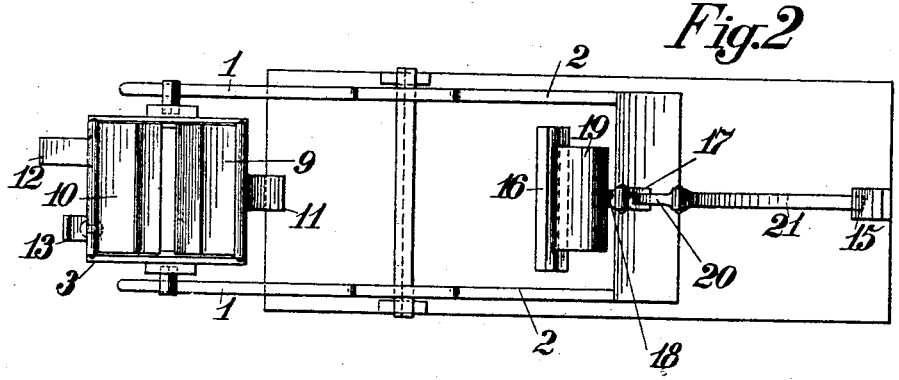

Figure 1 is a side elevation of one form of embodying the invention and Fig. 2 a plan of the same.

The weight of the material to be weighed is determined by the weight 2 plus the weight of the two levers 21 and 18 and the weight 19, which are attached to the said weight 2. At a suitable position on the frame of the weighing machine a stop 15 is provided against which the free end of the lever 21 strikes just before the scales balance. The lever 21 engages with its hook 20 over a similar hook 17 of the lever 18 and retains the latter in the position shown in Fig. 1.

Just before the scales balance, *i. e.* before the beam 1 attains its horizontal position, the stop 15 arrests the free end of the lever 21, thus causing the same to turn on its pivot and to disengage the hook 20 from the nose or hook 17 of the lever 18. After this disengagement the lever 18 falls, owing to the action of its weight 19 around its pivot and shifts the distribution of weight on the right arm of the beam, so that the scale containing the goods to be weighed is overbalanced and will move downwardly in order to be entirely emptied. The weight 19 should be advantageously so dimensioned that when it is released the scale containing the ware will sink sufficiently far and that when it finally rests on the column 16 it will be sufficient to prevent the scale containing the ware from rising again until it has been entirely emptied. When this has taken place, the scale 3 will rise rapidly owing to the weight at the right hand end of the beam, so that the weight 19 with its lever 18 will be suddenly swung on its pivot so that the hook 17 of the lever 18 will reëngage with the hook 20 of the lever 21, *i. e.* the parts will be returned to their initial positions.

The receptacle forming the scale 3 is provided with a cover consisting of one or more parts, in the drawing two parts 9 and 10 are shown. The door 9 carries an arm 11 and the door 10 is prolonged at 12. In addition to these parts the receptacle 3 is provided with an arm 13 and the hopper 4 for the wares with an arm 14.

The valves 7 and 8 of the hopper 4 are held normally closed by means of weighted levers 7′ and 8′ attached thereto, when the receptacle 3 is out of contact with the hopper. The door 9 as also that 10 will close by gravity when the receptacle is clear of the hopper. Door 9 is provided with an upturned arm 11, adapted to engage the weighted lever 7′ of the valve 7 when the receptacle rises and the latter is provided with an upwardly extending arm 13 adapted to lift the weighted arm 8′ of the valve 8 and open the latter when the receptacle rises, while an arm 14 fixed to the hopper engages the extension 12 of the door 10 as the said receptacle rises and opens the door 10. The parts are so weighted and dimensioned, that the upturned arm 11 will engage the weighted lever arm of valve 7 as the receptacle rises and these two parts will mutually operate to open each other as will be readily understood on reference to the drawing.

When the scale 3 falls the doors 9 and 10 close the moment the balance has been attained (Fig. 2). The doors 9 and 10 of the scale receptacle 3 are so formed that when closed they form a trough in which the material falling at the moment of the balance is caught. The material remaining in this trough forms a surplus weight but does not mix with the material in the receptacle which has been weighed. The receptacle is now emptied by means of known devices, which it is not necessary to describe further here, and remains in its lowest position until it has been properly emptied. When this has taken place the scale 3 rises under the influence of the weight 2 suddenly to the position shown in Fig. 1, and in so doing the mutual coöperation of the hopper and the doors 9 and 10, the openings 5 and 6 of the hopper are opened and also the doors 9 and 10, so that the material caught by the trough falls into the receptacle forming part of the next quantity of material to be weighed.

We claim as our invention:—

1. In an automatic weighing machine, the combination of a pivotally supported drop weight, forming part of the counter balancing weight and adapted to fall, when released across the beam support, a receptacle to receive the goods to be weighed and a hopper there-above, doors to the said receptacle to automatically close when the scales balance, a pivoted lever to retain the drop weight in the raised position, while the receptacle is being filled and means for releasing the said weight, immediately the scales balance substantially as described.

2. In an automatic weighing machine, the combination of a pivotally supported drop weight forming part of the counter balancing weight and adapted, when released to fall across the beam support, a receptacle for the goods to be weighed, having doors, normally closed by gravity, a hopper having valves, and mounted above said receptacle and means in connection with said doors and valves to open all of them when the receptacle contacts with or rises up to the hopper, means for supporting the drop weight in its upper position while the receptacle is being filled, and means for releasing the said weight when the scales balance substantially as described.

In testimony whereof we affix our signatures in the presence of two witnesses.

JULIUS ERTNER.
ARNOLD JERÉMIÁS.

Witnesses:
 JOSEPH WIEKMANN,
 LOUIS VANDORY.